July 10, 1962 — A. VANWERSCH — 3,043,108
MINE ROOF BAR ARRANGEMENT
Filed July 16, 1958 — 2 Sheets-Sheet 1
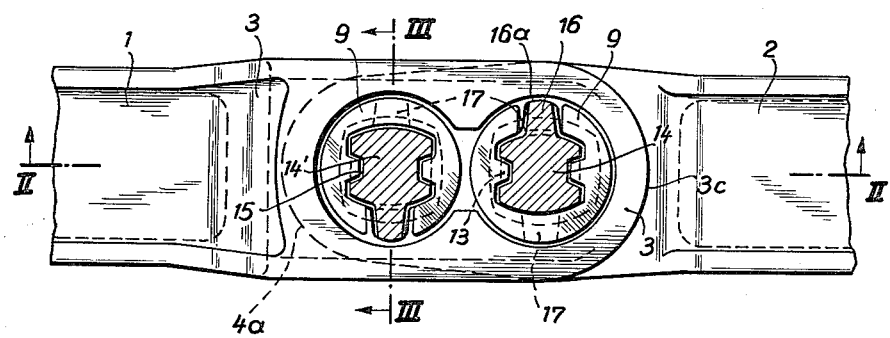
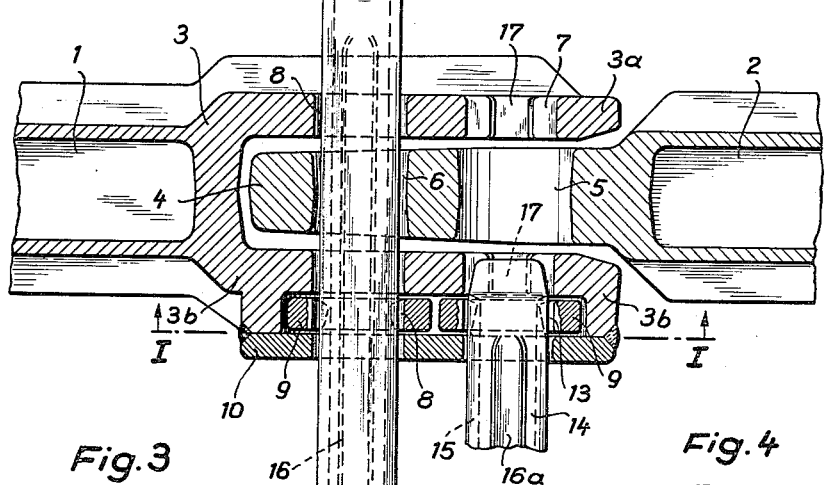
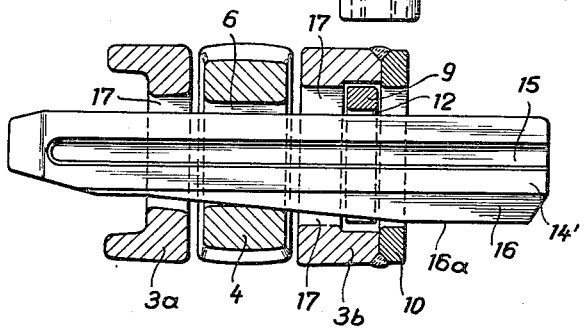
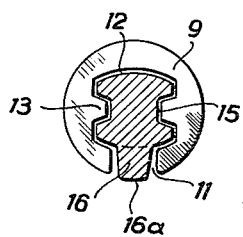
INVENTOR
Aloys VANWERSCH
by
Mestern & Kollin
ATTORNEYS

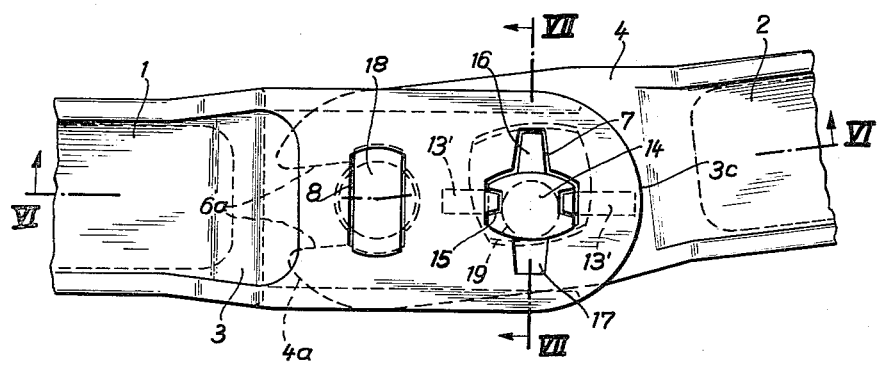
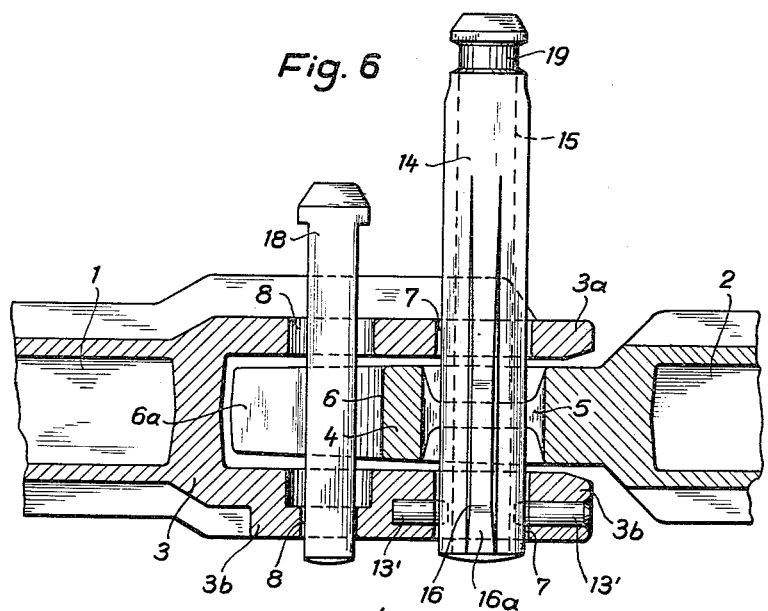
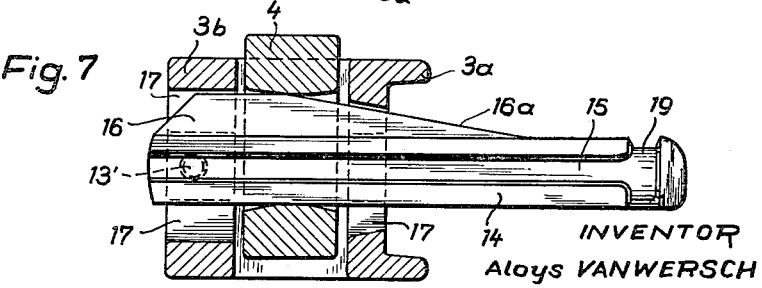

United States Patent Office 3,043,108
Patented July 10, 1962

3,043,108
MINE ROOF BAR ARRANGEMENT
Aloys Vanwersch, Heiderweg, Angermund, Bezirk, Dusseldorf, Germany
Filed July 16, 1958, Ser. No. 748,843
1 Claim. (Cl. 61—45)

The present invention concerns a detachable coupling for roof bars in underground mine workings.

Roof bars, otherwise known as shoring or lining irons, are usually made of rolled steel sections, serve to support the roof and are in turn supported by props set up between the deads and themselves; in suitable spaced relationship they form adjacent rows directed towards the face of the workings, whereby the foremost roof bar of each row is unsupported and rigidly connected with the next roof bar which is installed in its working position and supported by a prop. Moreover, it is necessary for the roof bar coupling to be detachable, so that each rearmost roof bar may be withdrawn, i.e. recovered.

An object of the invention is to provide a roof bar coupling of such a design that it has only cross bolts as coupling means of each pair of interlocked ends of the roof bars and moreover in a restricted space can be easily coupled or uncoupled by a single miner. For this purpose it is necessary for the roof bar to be put into position by first of all being articulated with the preceding roof bar which has been securely installed, then swung upwards towards the roof and finally by driving home a transversely displaceable bracing means whilst simultaneously pressing the roof bar against the roof, to permit it to be rigidly connected, viz. unsupported and loadably connected at the angular position resulting therefrom with the roof bar already installed. And vice versa it is necessary when withdrawing a roof bar to permit the rigid coupling with the adjacent roof bar which is left in position to be uncoupled by striking back the bracing means, the roof bar being swung down whilst the articulated connection still exists and finally for the articulated connection also to be disengaged.

A further object of the invention resides in the fact that the roof bar coupling is so designed that it hardly projects at the top and bottom beyond the actual section of the roof bar, and moreover when inserting the roof bar to be installed neither the free end of the firmly fitted roof bar, nor, when swinging downwards the roof bar to be withdrawn, should any portion of the roof bar in question project upwardly from the connection, and that the roof bar which is at the time being installed can be coupled with the adjacent roof bar which is already installed in each of the two angular positions 180° apart about its longitudinal axis.

It is furthermore an object of the invention to arrange the aforesaid cross bolts of the coupling and the bores serving to receive them in the ends of the roof bar in such a manner that with a comparatively short length an as effective as possible leverage is obtained which counteracts the roof pressure exerted on the unsupported roof bar which is being installed in the foremost position. The longer the leverage the lesser the stress exerted by the roof pressure against the individual coupling parts.

The invention will be further described, by way of example, with reference to the accompanying drawing, in which:

FIG. 1 is a side elevation partly in section on the line I—I of FIG. 2, of a capping coupling constructed in accordance with the invention;

FIGS. 2 and 3 are a longitudinal section and a cross-section respectively through a roof bar coupling on the lines II—II and III—III of FIG. 1 respectively;

FIG. 4 is a front elevation, partly in section, of individual coupling parts,

FIG. 5 is a view corresponding to FIG. 1 of an alternative roof bar coupling; and FIGS. 6 and 7 are a longitudinal and a cross-section respectively through the coupling on the lines VI—VI and VII—VII of FIG. 5 respectively.

In all embodiments shown roof bars 1 and 2 comprise rolled steel sections of the same shape. The sections have a fork end comprising shanks 3a and 3b and a tongue end 4 fitting into such a fork end 3. Each tongue end 4 has two cross bores 5 and 6, of which the bore 6 may be widened to form a mouth opening 6a. In each fork end 3 there are correspondingly provided two cross bores 7 and 8.

In the example shown in FIGS. 1 to 4 there is inserted in the fork shank 3b, in a widened portion of the bore 7, a rotatable ring body 9 which is secured against dropping out by means of a perforated plate 10 rigidly secured on this forked shank. Depending upon whether the widened bore portion, as shown, opens outwards or inwardly the perforated plate 10, after inserting the ring bodies 9, is fitted on the outside or inside of the forked shank. Each ring body 9 has a central cavity widened to form a slot 11, into which a constriction 13 projects from either side. In each ring body 9 there is guided a cross bolt 14 having longitudinal grooves 15 which permit it to slide along against the constrictions 13 and having a wedge shaped web 16 passing through the slot 11. The longitudinal grooves 15 merge towards one end of the cross bolt 14 into the actual bolt profile so that at this end the bolt cannot be knocked out of the ring body 9.

It is also possible to substitute, for the ring bodies 9 which are rotatably mounted in the forked shank 3b, stop pins 13' or the like, which engage laterally in the longitudinal grooves 15 of the cross bolt 14. In this case, the longitudinal grooves 15 on one end of the bolt merge into an annular groove 19, which when the cross bolt 14 is knocked back, permits this bolt to be turned between the stop pins 13' which are non-rotatably disposed in the forked shank 3b. In all the embodiments, the wedge-shaped web 16 prevents the bolt 14, which acts as a bracing means, to be knocked out in the other direction, thus it is arranged so as to be transversely displaceable in the transverse bore 7 of the associated forked shank 3b and so as not to be removable. The wedge-shaped web 16 of each cross bolt 14 acting as a bracing means, has a rounded outer surface 16a. The bores 7 in the forked shanks 3a and 3b serving to receive the transverse bolt 14 are each widened in an upward and downward direction to form a slot 17, into which the wedge-shaped web 16 fits. If the bolt 14 is in the position in which it has been knocked to the rear it can be turned in the forked shank 3b, and it can be driven home with the wedge web 16 facing either upwards or downwards.

The transverse bore 8 of each forked end 3 also serves to receive a further cross bolt which, if necessary, may have the same shape as the cross bolt 14 and, similarly to the latter, is mounted so that it is not removable from the forked shank 3b; FIGS. 1 to 4 show the further cross bolt 14' and the cross bolt 14. In the embodiments shown in FIGS. 5 and 6 the further cross bolt is slidably mounted in the cross bore 8 of each bifurcated end 3 and is designed as a link pin 18 flattened at either side and preferably conically tapered and irremovably mounted.

In all examples the cross bores 5 and 6 of the tongue ends 4 and also the cross bores 7 and 8 of the bifurcated ends 3 are located in the central longitudinal axis of the associated roof bars 1 and 2. Therefore it is possible for the roof bar which is to be installed which, in the examples illustrated, is the roof bar 2, to be connected in each of its two possible turning positions, 180° apart, about its longitudinal axis, with a roof bar 1 which is already fixed in position and supported by a prop.

For the purpose of effecting such a connection the two cross bolts 14 and 14' are, in accordance with the example shown in FIG. 1, knocked back to such an extent that, with their inner ends, they are only located in the forked shank 3b. The tongue end 4 of the roof bar 2 is then inserted from below into the fork end 3 of the roof bar 1 to such an extent that the cross bores 6 and 8 of the two roof bars are substantially in register. The cross bolt 14' is then inserted to such an extent that its inner end passes through the cross bore 6 of the tongue end 4. In this position of the cross bolt 14' it is possible for the roof bar 2, which is to be installed, to be swung upwardly about this bolt, which acts as a pivot bolt until the free end of the roof bar 2 abuts against the roof. Depending upon the course of the roof the roof bar 2 is situated in a vertical plane, thus coaxially or at an angle to the roof bar 1 which is already installed. The cross bore 5 of the tongue end 4 is of such a width that in the position of the roof bar 2, which is to be advanced, it is possible for the cross bolt 14 acting as bracing means to be driven home through this bore 5 right into the bore 7 of the forked shank 3a. The wedge shaped web 16 of the bolt 14 facing upwards thus presses against that portion of the wall surface of the cross bore 5 which is opposite to the rounded outer surface thereof and tends to swing the roof bar 2 about the link bolt 14' further upwards by urging it against the roof. The cross bolt 14', the wedge shaped web 16 of which faces downwardly, is also firmly driven home; this bolt 14' as far as it is still possible, also tends to swing the roof bar 2 upwards about the link bolt 14. By this means there is attained a particularly rigid connection, secure against any slackening, of the unsupported roof bar which is being installed and which is thereby urged against the roof, with the already firmly installed roof bar 1.

In all the embodiments the pressure exerted by the bracing means against the roof bar 2 acts in the direction which is coaxial to both roof bars 1 and 2, perpendicular to the longitudinal axis of the roof bar 2 which is being installed. This direction of pressure is substantially maintained also if the roof bar 2, after being installed, is disposed at an angle relative to the roof bar 1. The rounded outer surface 16a of the wedge shaped web 16 of the bolt 14 thus always abuts against the internal wall surface of the cross bore 5 of the tongue end 4. There is practically no slip between the outer surface 16a of the web 16 and the counter surface of the tongue end 4 associated therewith because it is not necessary for these two surfaces to be firmly drawn one on to the other in the longitudinal direction of the roof bar 2.

With progressive working it is possible for the roof bar 2 hitherto unsupported, in the same way as the roof bar 1, to be supported by a prop, so that a further unsupported roof bar may be joined directly to the roof bar 2. In the case of very short roof bars it is sufficient in circumstances, for each second roof bar to be supported by a prop. The thrust exerted by the props act against a yield to buckling in a downward direction of the roof bars connection supported by prop. In order to prevent such buckling, it is only necessary in all the embodiments shown for the bolt 14 to be driven back into the bifurcated shank 3b, to turn it in this bifurcated shank through 180° and then to drive it home firmly again. The web 16 of the bolt 14 is thus now located transposed by 180° relative to its position shown in FIGS. 1 and 5 and therefore when this bolt 14 is driven in again, it tends to swing the roof bar 2 in a downward direction without necessitating the connection of the two roof bars 1 and 2 which is still maintained by the further cross bolts 14' or 18 to be undone, resulting in a roof bar connection secure against buckling in a downward direction.

In each row of roof bars it is possible, after supporting the preceding roof bar 2 by means of a prop, for the rearmost roof bar 1 to be withdrawn conveniently in a reversed sequence to those described for the installation of the roof bar 2.

The cross bores 6 of the tongue ends 4 and the cross bores 7 of the fork ends 3 are situated at such a distance from the end face 4a or 3c of the particular roof bar end that this end neither when connecting the articulated coupling with the end of the other roof bar, i.e. when adding a new roof bar or when disconnecting the articulated coupling, i.e. when withdrawing a roof bar, projects upwardly from the roof bar coupling. Moreover, the drawing shows that the roof bar coupling itself hardly projects either downwardly or upwardly beyond the actual section of the roof bars 1 and 2.

I claim:

In a mine roof bar arrangement including two roof bars in substantial longitudinal alignment with a detachable end to end connection, one end of each bar terminating in a longitudinal tongue having a first pair of parallel transverse bores spaced longitudinally of the bar, the other end of each bar terminating in a pair of longitudinal parallel legs defining a fork, each leg having a pair of parallel transverse bores spaced longitudinally of the bar and transversely aligned with the bores of the other leg of the same fork, each bore of each leg having transverse slots disposed diametrically opposite each other and lying in a plane perpendicular to the longitudinal axis of the respective bar while passing through the central axis of the aligned bores of the leg, said end to end connection between the bars comprising one of the tongues positioned between the legs of one of the forks with the bores of the tongue aligned with the bores of each leg of the respective fork, each set of aligned bores in the connection having a pin slidably positioned therein with wedging contact against the wall of the tongue and providing movement of the tongue in a first direction perpendicular to the respective pin and in said plane common to said slots, each pin having a rib extending lengthwise with a taper towards a smaller end of the pin and with the rib slidably guided in one of said slots, said pins having retaining means comprising a pair of ring bodies, each body rotatably secured to one of the legs and positioned coaxially of one of said sets of aligned bores, each ring body having an abutment projecting into its bore, each pin having a longitudinal groove terminating short of said smaller end with stop means, each pin also slidably mounted in one of said ring bodies with said lug slidable in said longitudinal groove, said smaller end of each pin insertable through its respective set of bores but restricted when withdrawn by the stop means engaging the lug and in which position the pin is free for rotation with the body to a second position wherein the rib may be inserted in the other slot of the same bore to wedge the tongue in a direction opposite to said first name direction.

References Cited in the file of this patent
FOREIGN PATENTS

| | | |
|---|---|---|
| 722,202 | Great Britain | Jan. 19, 1955 |
| 726,000 | Great Britain | Mar. 16, 1955 |
| 540,613 | Belgium | Sept. 15, 1955 |
| V4526 | Germany | Dec. 22, 1955 |
| 770,741 | Great Britain | Mar. 20, 1957 |